(12) United States Patent
Westwater et al.

(10) Patent No.: US 10,085,015 B1
(45) Date of Patent: Sep. 25, 2018

(54) METHOD AND SYSTEM FOR MEASURING VISUAL QUALITY OF A VIDEO SEQUENCE

(71) Applicant: ZPEG, Inc., Austin, TX (US)

(72) Inventors: Raymond J. Westwater, Austin, TX (US); Jeffrey S. Perry, Austin, TX (US)

(73) Assignee: ZPEG, Inc., Austin, TX (US)

( * ) Notice: Subject to any disclaimer, the term of this patent is extended or adjusted under 35 U.S.C. 154(b) by 0 days.

(21) Appl. No.: 15/432,296

(22) Filed: Feb. 14, 2017

(51) Int. Cl.
| | | |
|---|---|---|
| H04N 17/04 | (2006.01) | |
| H04N 17/00 | (2006.01) | |
| G06T 7/00 | (2017.01) | |
| G06K 9/52 | (2006.01) | |
| G06K 9/00 | (2006.01) | |
| G06K 9/62 | (2006.01) | |

(52) U.S. Cl.
CPC ......... *H04N 17/00* (2013.01); *G06K 9/00758* (2013.01); *G06K 9/52* (2013.01); *G06K 9/6215* (2013.01); *G06T 7/0002* (2013.01); *G06T 2207/10016* (2013.01); *G06T 2207/20048* (2013.01); *G06T 2207/30168* (2013.01)

(58) Field of Classification Search
CPC .................................................. H04N 17/004
USPC ................................ 348/180, 184, 189, 192
See application file for complete search history.

(56) References Cited

U.S. PATENT DOCUMENTS

| | | | | |
|---|---|---|---|---|
| 6,018,361 A * | 1/2000 | Fujii | ....................... | H04N 17/04 348/180 |
| 6,285,797 B1 * | 9/2001 | Lubin | .................. | H04N 17/004 348/E17.003 |
| 6,441,847 B1 * | 8/2002 | Link | ...................... | H04B 7/082 348/180 |
| 6,493,023 B1 * | 12/2002 | Watson | ................ | H04N 17/004 348/180 |
| 7,715,592 B1 * | 5/2010 | Hollier | ................... | H04N 17/00 348/192 |
| 8,184,164 B2 * | 5/2012 | Yang | ...................... | G06T 1/0028 348/180 |
| 8,395,708 B2 * | 3/2013 | Lee | ......................... | H04N 5/205 348/625 |
| 8,947,538 B2 * | 2/2015 | Davis | .................... | H04N 17/004 348/192 |
| 2013/0251045 A1 * | 9/2013 | Gu | ......................... | H04N 19/57 375/240.16 |
| 2015/0222932 A1 * | 8/2015 | Liao | ...................... | H04N 17/004 375/240.27 |

(Continued)

OTHER PUBLICATIONS

Ponomarenko et al., "On Between-coefficient Contrast Masking of DCT Basis Functions," in Proceedings of the 3rd International Workshop on Video Processing and Quality Metrics for Consumer Electronics (VPQM '07), Scottsdale, Arizona, Jan. 2007.

(Continued)

*Primary Examiner* — Paulos M Natnael
(74) *Attorney, Agent, or Firm* — Lee & Hayes, PLLC

(57) ABSTRACT

A system configured to apply a human visual system model at one or more human visual system model settings to a reference video sequence and a distorted video sequence to determine a quality score of the distorted video sequence with respect to the reference video sequence is described. The human visual system model settings of the human visual system model are representative of at least one condition associated with an individual viewing the distorted video sequence.

19 Claims, 13 Drawing Sheets

(56) References Cited

U.S. PATENT DOCUMENTS

| | | | |
|---|---|---|---|
| 2016/0029015 A1* | 1/2016 | Jiang | G06T 7/0002 |
| | | | 348/192 |
| 2016/0212432 A1* | 7/2016 | Wang | H04N 19/53 |
| 2016/0330439 A1* | 11/2016 | Yu | H04N 17/02 |
| 2017/0019454 A1* | 1/2017 | Almohamedh | H04L 65/80 |

OTHER PUBLICATIONS

Wang et al., "Image Quality Assessment: From Error Visibility to Structural Similarity," IEEE Transactions on Image Processing, vol. 13, No. 4, pp. 600-612, Apr. 2004.

P. C. Teo and D. J. Heeger, "Perceptual Image Distortion," in Proceeding of IEEE International Conference on Image Processing, vol. 2, pp. 982-986, Nov. 1994.

S. Winkler, "Digital Video Quality: Vision Models and Metrics." New York: Wiley, 2005, 192 pp.

Masry et al., "A Scalable Wavelet-based Video Distortion Metric and Applications," IEEE Trans. Circuits System Video Technology, vol. 16, No. 2, pp. 260-273, 2006.

Wolf et al., "Video Quality Model for Variable Frame Delay (VQM_VFD)," U.S. Department of Commerce, National Tellecommunication and Information Administration, Boulder, CO, USA, Tech. Memo TM-11 482, Sep. 2011.

Masry et al., A Metric for Continuous Quality Evaluation of Compressed Video with Severe Distortions, Signal Processing: Image Communication, vol. 19, No. 2, pp. 133-146, Feb. 2004.

\* cited by examiner

METHOD AND SYSTEM FOR MEASURING VISUAL QUALITY OF A VIDEO SEQUENCE

BACKGROUND

Content providers typically attempt to measure quality of video content being displayed to an end user in a qualitative sense that the end user is able to understand. Typically, the content providers generate a differential mean opinion score (DMOS) for each video sequence being sent, transmitted, and/or displayed to the end user. Conventionally, the DMOS of a video sequence is determined by displaying a reference video sequence to a group of individuals, typically consisting of 20 to 50 viewers. Each of the individuals then rates the reference video sequence using a predefined scale. The same group of individuals is then shown a processed or distorted version of the reference video sequence and again asked to rate the video sequence using the predefined scale. An averaged difference between the subjective score of the reference video sequence and the subjective score of the distorted version of the reference video sequence is utilized as the DMOS. Unfortunately, obtaining a DMOS score in this manner is costly, time consuming, and subject to variability based on the individuals selected for the group.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Introduction

Figure 1:
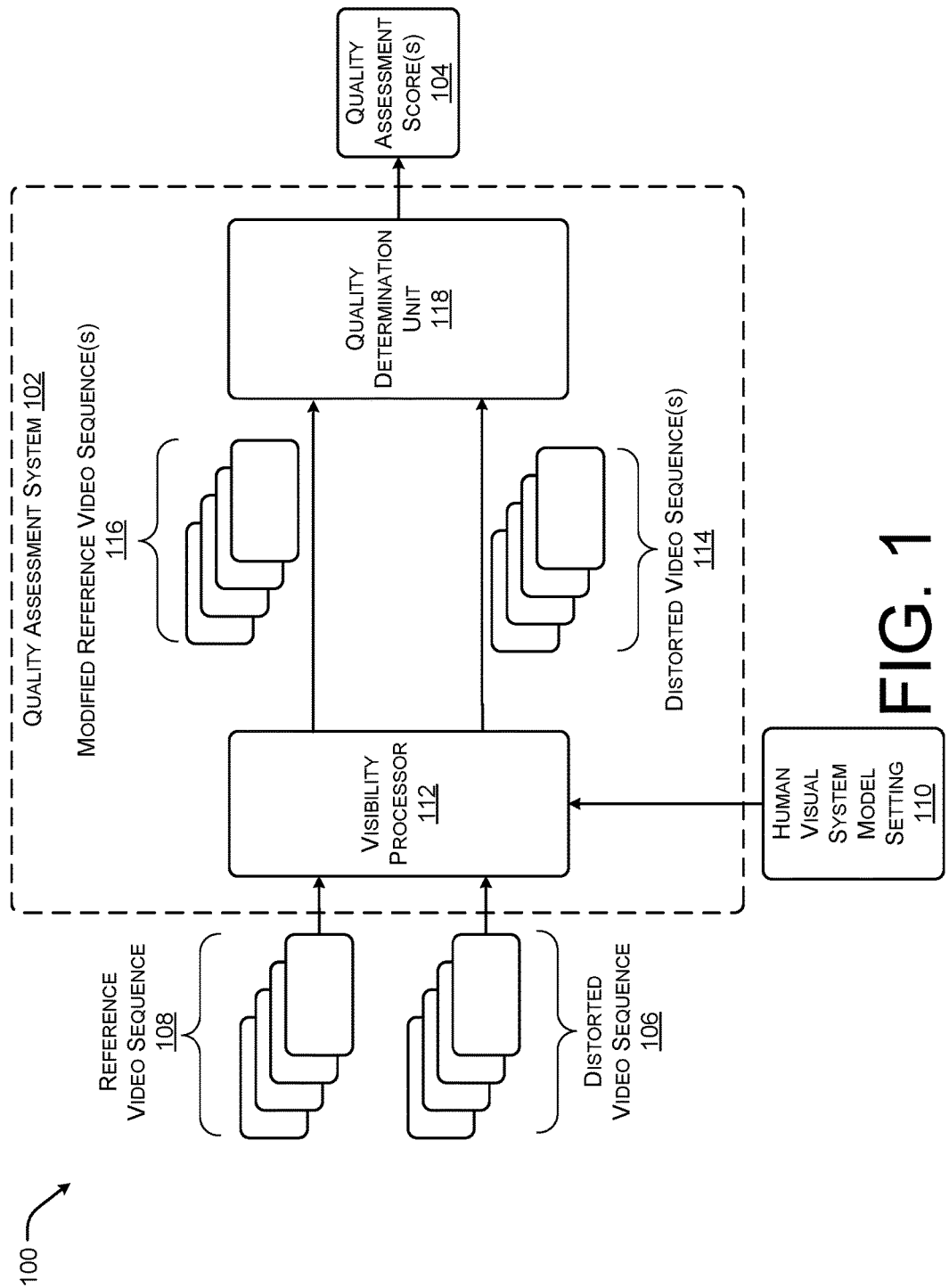
FIG. 1 illustrates an example block diagram of a quality assessment system for determining a quality assessment score of a distorted video sequence with respect to a reference video sequence according to some implementations.

This disclosure includes systems and implementations for determining a quality assessment score or metric for quantitatively rating a video sequence based on quality without introducing the subjectivity and variation typically experienced in conventional rating systems that rely on human individuals. In general, content providers attempt to measure quality of video content being provided and displayed to end users in a qualitative manner in order to inform the end users of the quality of the content and to meet various standards associated with the industry. Conventionally, the content providers generate a differential mean opinion score (DMOS) for each video sequence being sent, transmitted, and/or displayed to the end user. The DMOS of a video sequence is determined by the content provider by first displaying a reference video sequence to a group of individuals, typically consisting of 20 to 50 viewers. Each of the individuals then rates the reference video sequence using a predefined scale (typically a score of 1 to 5). The same group of individuals is then shown a processed or distorted version of the reference video sequence and again asked to rate the video sequence using the predefined scale. For instance, the reference video sequence may be encoded and decoded prior to the second display to produce the distorted version of the reference video sequence. An averaged difference between the subjective score of the reference video sequence and the subjective score of the distorted version of the reference video sequence is utilized as the DMOS. Unfortunately, obtaining a DMOS score in the conventional manner is costly, time consuming, and subject to variability based on the individuals selected for the group. Thus, described herein, is a system to rate the quality of a video sequence without the use of human based study groups.

In some implementations, the system may be configured to modulate the visual quality of both a reference video sequence and a processed or distorted video sequence using a human visual system model. The human visual system model is utilized to represent the viewing condition or experience of an end user with respect to the video sequence being displayed. For instance, the human visual system model may include factors that reflect the spatial parameters associated with a viewing experience (e.g., a distance of a viewer from a screen, a size of the screen, a resolution of the screen, etc.) as well as temporal parameters associated with the viewing experience (e.g., frame rate, refresh rate, etc.). In some cases, the human visual system model may use quantizers applicable to a decorrelated transform domain that are controlled through human visual system model settings. By modulating the setting of the human visual system model and applying it to the image sequences, the system is able to determine the quality of the processed or distorted video sequence with respect to the reference video sequence.

For example, as an individual viewer moves further away from the display device or screen, quality differences between the referenced video sequence and the processed or distorted video sequence become harder to detect. Similarly, as a screen size or resolution is reduced, a viewer has a harder time distinguishing differences in quality. Thus, the system may apply the human visual system model at various visibility (vB) settings to the referenced video sequence and the distorted video sequence to model the various viewing conditions (such as distance and resolution) and determine a difference that may be quantified as an error or difference metric (e.g., mean squared error (MSE)) between the two video sequences. For instance, in one example, an MSE of zero may indicate that at the current vB setting an average viewer is unable to detect a quality difference between the referenced video sequence and the distorted video sequence. In other cases, the perceivable content of the two video sequences may converge at a value other than an MSE or quality assessment score of zero. In these cases, the convergence may indicate that the viewer is unable to detect a quality difference between the referenced video sequence and the distorted video sequence.

In some cases, the error or difference metric value determined based on the human visual system model settings associated with the human visual system model may be translated into a DMOS metric by applying a regression analysis to the MSE values obtained at individual human visual system model settings. Thus, the system described herein enables the content provider to provide the user with an objective score related to video quality and a DMOS value that the content provider may utilize to meet various industry standards.

In some implementations, the system may receive both the referenced video sequence and the distorted video sequence from a video source and apply the human visual system model settings to generate difference metric or quality assessment scores at the various vB settings. In other implementations, the system may be configured to receive a referenced video sequence and to generate the distorted video sequence by causing the referenced video sequence to undergo operations common in the video processing industry, such as spatial down sampling, temporal down sampling, bandwidth encoding, color quantization, interlacing, spatial blurring, among others. Once the distorted video sequence is generated, the system may apply the human visual system model at various vB settings to the referenced video sequence and the distorted video sequence to output the quality assessment scores at the various human visual system model or vB settings, as discussed above.

In still other cases, the system may be configured to apply various operations, such as pre-processing, encoding, and decoding to a referenced video sequence to generate a distorted video sequence representative of a video sequence that has been transmitted over a network for display by, for instance, a user's set-top-box. In this manner, the quality assessment score identified is representative of the quality of the referenced video sequence as displayed to a user. In some cases, the human visual system model settings may be selected based on standard viewing conditions, such as standard distances of a user from a standard size television.

In one particular example, the system may be configured to receive the quality assessment score at various human visual system model settings as an input to determine at what human visual system model settings the distorted video sequence has substantially similar quality to the referenced video sequence. In some instances, this information may be utilized by the content provider to adjust the compression or pre-processing of the referenced video sequence to achieve a desired quality assessment score with respect to the compressed, transmitted, decompressed video sequence. Similarly, in some cases, the content provider may have additional information obtained via user surveys, viewing history, equipment setup, or monitored/collected by the set-top-box or display device. In these cases, the content provider may utilize the user information to select a human visual system model setting that is appropriate for the individual user's viewing environment (e.g., a known distance from the display device and a size of the screen) to determine the quality assessment score of a video sequence for the individual user. In some instances, the content provider may utilize the system to adjust the pre-processing and encoding of the referenced video sequence to achieve a distorted video sequence that has a desired quality assessment score with respect to the individual user.

Example Implementations

FIG. 1 illustrates an example block diagram 100 of a quality assessment system 102 for determining a quality assessment score 104 of a distorted video sequence 106 with respect to a reference video sequence 108 according to some implementations. As discussed above, content providers often attempt to measure quality of video content being provided and displayed to end users. In this example, rather than use a human based rating system, such as the DMOS ratings discussed above, the quality assessment unit 102 may be configured to receive the distorted video sequence 106 and the reference video sequence 108 as well as human visual system model settings 110. In this example, the distorted video sequence 106 may be a processed, pre-processed, encoded and decoded, etc. version of the reference video sequence 108. For instance, the distorted video sequence 106 may have been spatial down sampled, temporal down sampled, bandwidth encoded, color quantized, interlaced, spatially blurred, among others.

In the illustrated implementation, the distorted video sequence 106, the reference video sequence 108, and the visibility setting 110 may be received by a human visual system processor 112. The human visual system processor 112 may be configured to apply the human visual system model at various human visual system model settings 110 to both the distorted video sequence 106 and the reference video sequence 108. For example, the human visual system processor 112 may process the distorted video sequence 106 and the reference video sequence 108 to simulate viewing conditions, such as frame rate, screen size/resolution, distance from a display device, etc. with respect to both the distorted video sequence 106 and the reference video sequence 108. For instance, the human visual system model settings 110 may be spatial/temporal representation of human visibility characteristics. In one particular example, the human visual system processor 112 may apply the human visual system model 110 in a decorrelated transform domain space. In this example, the human visual system model settings 110 may be represented as quantizers associated with the human visibility characteristics.

In some cases, the human visual system processor 112 may be configured to receive multiple human visual system model settings 110 which may be applied to both of the distorted video sequence 106 and the reference video sequence 108. In this manner, the quality assessment system 102 may simulate multiple viewing conditions to determine at least one condition, such as a minimum distance, at which the quality assessment scores 104 for the distorted video sequence 106 and the reference video sequence 108 converge.

For each human visual system model setting 110 received by the human visual system processor 112, a distorted video sequence 114 and a modified reference video sequence 116 is generated using a particular human visual system model setting 110. The modified distorted video sequence 114 and the modified reference video sequence 116 are then received by a quality determination unit 118. In some cases, the quality determination unit 118 may determine a quantitative difference measure between the modified distorted video sequence 114 and the modified reference video sequence 116. For instance, quality determination unit 118 may determine the quality assessment score 104 at the particular human visual system model setting 110 applied to the modified distorted video sequence 114 and the modified reference video sequence 116 by using a mean squared error (MSE). For example, the difference value at each pixel in each frame from the modified reference video sequence 116 is compared to each pixel in each frame from the modified distorted video sequence 114 as follows:

$$MSE = 1/N \sum_{i,j} (\text{Reference}(i, j) - \text{Distorted}(i, j))^2$$

where i, j are pixel indices of the modified distorted video sequence 114 and the modified reference video sequence 116. In other examples, the quality determination unit 118 may determine the quality assessment score 104, such as a peak signal-to-noise ratio. In another alternative example, the quality assessment score 104 at the particular human visual system model setting 110 may be determined by the mean squared error of various block sizes of quantized coefficients associated with each block of pixels in the modified reference video sequence 116 and modified distorted video sequence 114. In this case, i and j in the preceding MSE equation would be the index of the quantized preprocessor coefficient associated with pixel i, j in the modified reference video sequence 116 and modified distorted video sequence 114.

Figure 2:
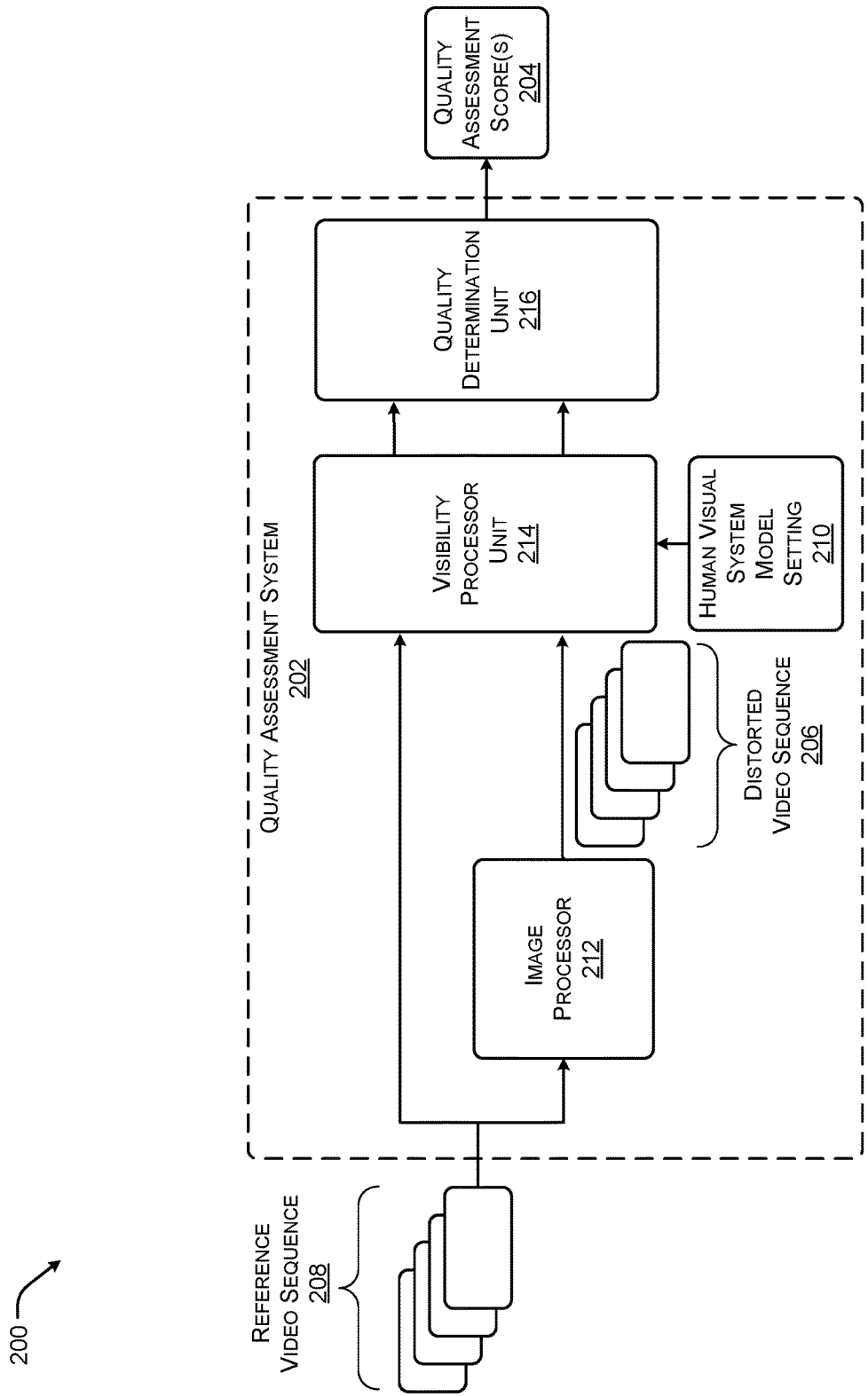
FIG. 2 illustrates another example block diagram of a quality assessment system for determining a quality assessment score of a distorted video sequence with respect to a reference video sequence according to some implementations.

FIG. 2 illustrates another example block diagram 200 of a quality assessment system 202 for determining a quality assessment score 204 of a distorted video sequence 206 with respect to a reference video sequence 208 according to some implementations. As in FIG. 1 above, in the illustrated example, rather than use a human based rating system, such as the DMOS ratings discussed above, the quality assessment unit 202 may be configured to determine the quality assessment score 204 by comparing the distorted video sequence 206 and the reference video sequence 208 following the completion of operations associated with applying the human visual system model at various human visual system model settings 210 to both the distorted video sequence 206 and the reference video sequence 208.

Unlike the example of FIG. 1, in the current example, the quality assessment system 202 may receive the reference video sequence 208 and include an image processing unit 212 to generate the distorted video sequence 206 based on one or more selected image processing operations (e.g., blurring, encoding, decoding, sampling, etc.). In this manner, the quality assessment system 202 may be able to output the quality assessment scores 204 with respect to various image processing operations as well as various human visual system model settings 210.

Once the distorted video sequence 206 is generated, a visibility processor unit 214 may be configured to apply the human visual system model at selected human visual system model settings 210 to both the distorted video sequence 206 and the reference video sequence 208. For example, the visibility processor 214 may process the distorted video sequence 206 and the reference video sequence 208 to simulate viewing conditions associated with an end user. In one specific example, the human visual system model setting 210 may be a spatial/temporal quantizer applied in a temporal transform domain space.

In some instances, the visibility processor 214 may be configured to receive multiple human visual system model settings 210 which may be applied to both of the distorted video sequence 206 and the reference video sequence 208. In this manner, the quality assessment system 202 may simulate multiple viewing conditions to determine at least one condition, such as a minimum distance, at which the quality assessment scores 204 for the distorted video sequence 206 and the reference video sequence 208 converge.

For each human visual system model setting 210 received by the visibility processor 214 a modified distorted video sequence (not shown) and a modified reference video sequence (not shown) is generated using a particular human visual system model setting 210. The modified distorted video sequence and the modified reference video sequence are then received by a quality determination unit 216. In some cases, the quality determination unit 216 may determine a quality assessment score 204 (such as a quantitative difference score) between the modified distorted video sequence and the modified reference video sequence for each human visual system model setting 210 and pair of modified video sequences.

Figure 3:
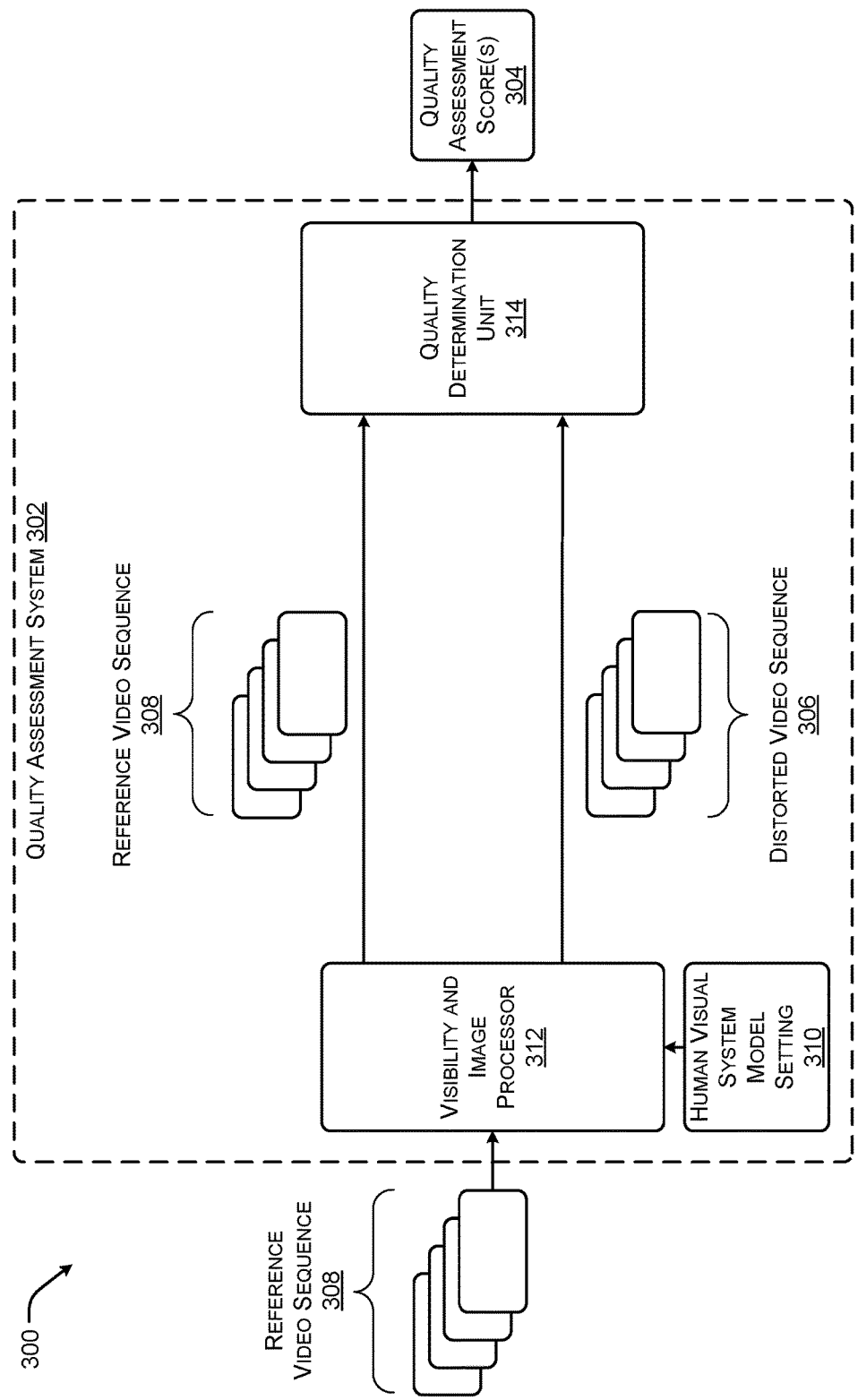
FIG. 3 illustrates yet another example block diagram of a quality assessment system for determining a quality assessment score of a distorted video sequence with respect to a reference video sequence according to some implementations.

FIG. 3 illustrates yet another example block diagram 300 of a quality assessment system 302 for determining a quality assessment score 304 of a distorted video sequence 306 with respect to a reference video sequence 308 according to some implementations. As in FIG. 2 above, in the current example, the quality assessment system 302 may receive the reference video sequence 308 from an external source (not shown). In this example, the visibility and image processor 312 may be configured to perform operations associated with processing the reference video sequence 308 to generate the distorted video sequence 306 and to apply the human visual model at one or more human visual system model settings 310 selected by the quality assessment system 302 or a content provider. Thus, in this example, the visibility and image processing 312 may first generate the distorted video sequence 306 based on one or more selected image processing operations (e.g., blurring, encoding, decoding, sampling, etc.). The visibility and image processing 312 may then perform operations associated with a selected human visual system model setting 310 to both the distorted video sequence 306 and the reference video sequence 308.

After pre-processing and operations associated with the human visual system model setting 310 are complete, the distorted video sequence 306 and the reference video sequence 308 are received by a quality determination unit 314. In some cases, the quality determination unit 314 may determine a quality assessment score 304 between the distorted video sequence 306 and the reference video sequence 308.

Figure 4:
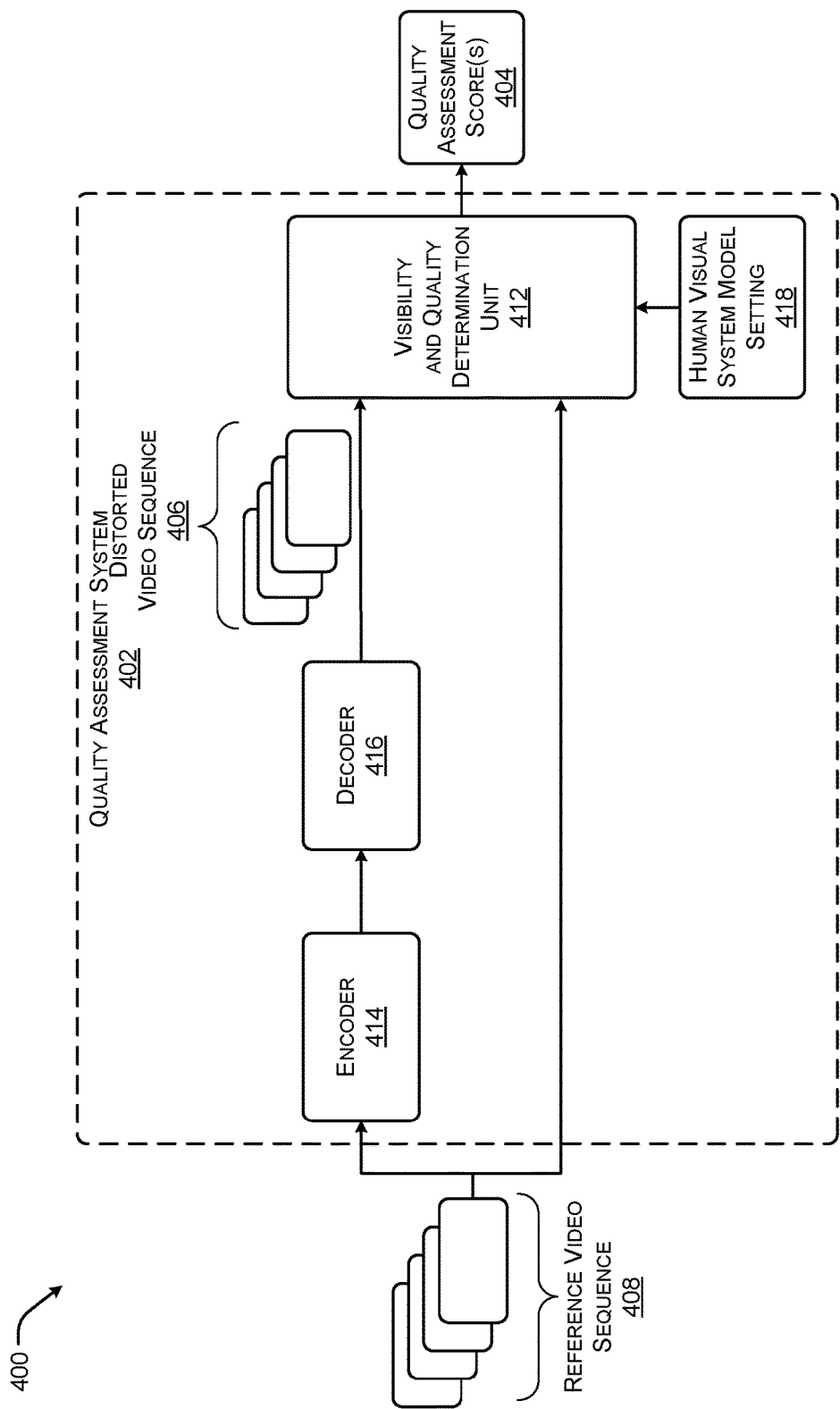
FIG. 4 illustrates another example block diagram of a quality assessment system for determining a quality assessment score of a distorted video sequence with respect to a reference video sequence according to some implementations.

FIG. 4 illustrates another example block diagram 400 of a quality assessment system 402 for determining a quality assessment score 404 of a distorted video sequence 406 with respect to a reference video sequence 408 according to some implementations. In the current example, the reference video sequence 408 may be received by the quality assessment system 402. The system 400 may provide a copy of the original reference video sequence 408 to a visibility and quality determination unit 412 and a copy of the pre-processed video sequence (not shown) to an encoder 414.

The encoder 414 may then compress the pre-processed video sequence in a manner substantially similar to encoding and transmitting of the reference video sequence 408 over a network. The encoder 414 may then provide the compressed pre-processed video sequence (not shown) to a decoder 416. The decoder 416 may decompress the compressed pre-processed video sequence to generate the distorted video sequence 406 representative of a video sequence received by a viewer.

Once the distorted video sequence 406 is generated, the visibility and quality determination unit 412 may perform operations associated with a selected human visual system model setting 418 to both the distorted video sequence 406 and the reference video sequence 408. Next, the visibility and quality determination unit 412 may determine a quality assessment score 404 between the distorted video sequence 406 and the reference video sequence 408, as discussed above.

Figure 5:
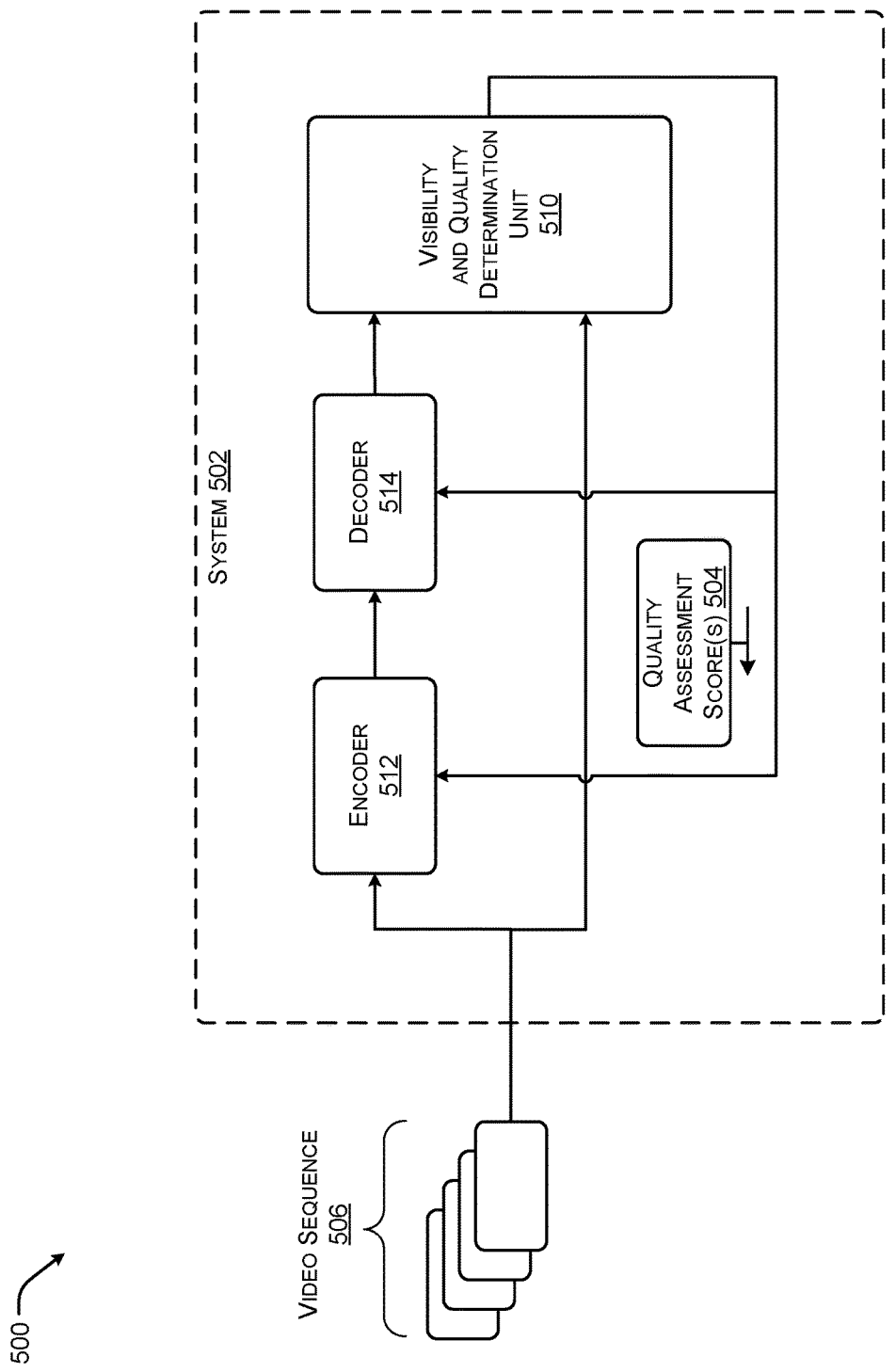
FIG. 5 illustrates another example block diagram of a system for utilizing a quality assessment score to improve the viewing experience of a video sequence according to some implementations.

FIG. 5 illustrates another example block diagram 500 of a system 502 for utilizing a quality assessment score 504 to improve the viewing experience of a video sequence 506 according to some implementations. In the current example, the video sequence 506 may be received by the system 502. The system 500 may provide a copy of the original video sequence 506 to a visibility and quality determination unit 510 as a reference video sequence discussed above and a copy of the pre-processed video sequence to an encoder 512.

The encoder 512 may compress the pre-processed video sequence in a manner associated with preparing the video sequence 506 for transmission over the network. The encoder 512 may provide the compressed pre-processed video sequence to a decoder 514. The decoder 514 may decompress the compressed pre-processed video sequence to generate a distorted video sequence representative of a video sequence received by a viewer.

Once the distorted video sequence is generated, the visibility and quality determination unit 510 may perform operations associated with a selected human visual system model settings to both the distorted video sequence and the reference or original video sequence. Next, the visibility and quality determination unit 510 may determine a quantitative difference score 504 between the distorted video sequence and the reference video sequence, as discussed above. In this example, the quantitative difference scores 504 may be provided as an input back to the encoder 512 and/or the decoder 514 to assist in tuning the pre-processing, encoding, and decoding parameters to achieve a desired quality with respect to the transmitted the video sequence.

Figure 6:
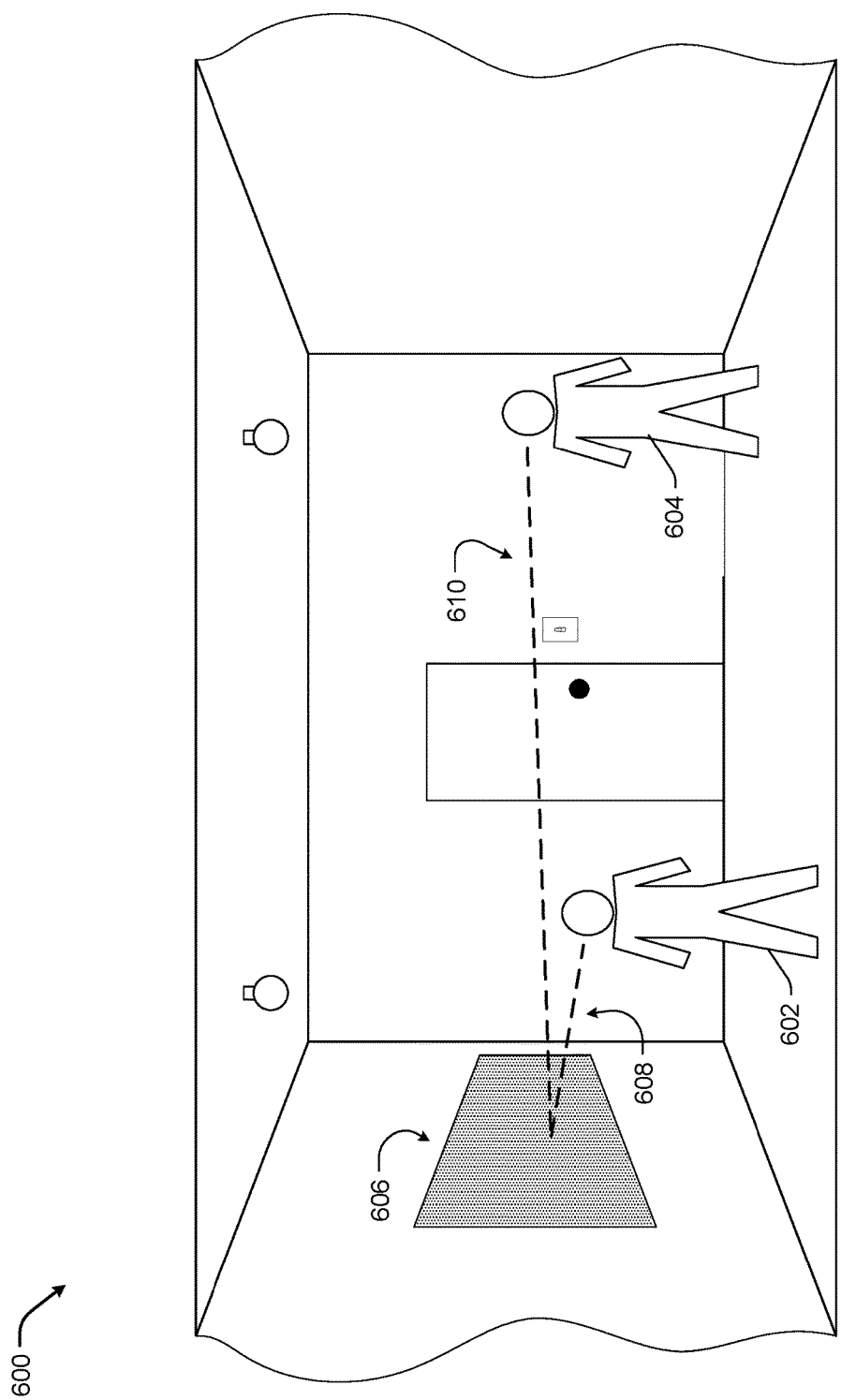
FIG. 6 is an example illustrating a first viewer and a second viewer each having a different viewing experience with respect to a video sequence according to some implementations.

FIG. 6 illustrates an example 600 illustrating a first viewer 602 and a second viewer 604 each having a different viewing experience with respect a video sequence being presented on a display device 606 according to some implementations. For instance, in the current example, the first user 602 may be less than one screen size from the display device 606, generally indicated by distance 608, while the second user may be approximately three screen sizes from the display device 606, generally indicated by distance 610. Thus, the second viewer 604 may perceive greater quality with respect to a video sequence presented on the display device 606 than the first viewer 602.

In this scenario, the quality assessment score generated by the quality assessment system of FIGS. 1-5 above, may be determined with respect to the two human visual system model settings. For instance, the first human visual system model setting may be based at least in part on the first distance 608 and the second human visual system model setting may be based at least in part on the second distance 610. In this example, if the quality assessment system has access to information related to the distances 608 and/or 610, the quality assessment system may process the video sequence in a manner to achieve a desired quality assessment score based on the first human visual system model settings (e.g., the settings associated with the first viewer 602 nearer to the display device 606).

Figure 7:
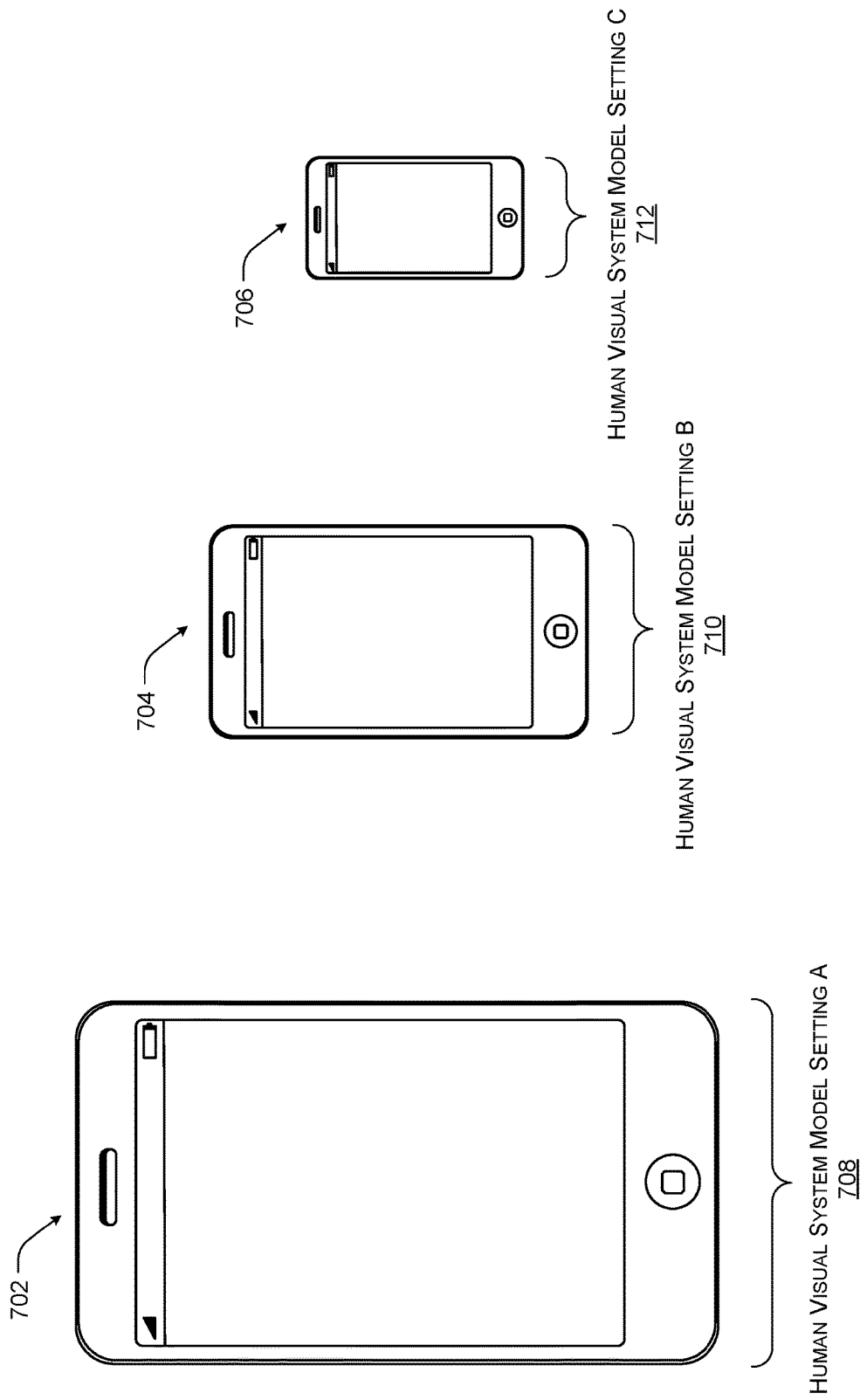
FIG. 7 illustrates an example illustrating a first display device, a second display device, and a third display device at various distances according to some implementations.

FIG. 7 illustrates an example illustrating a first display device 702, a second display device 704, and a third display device 706 at various distances according to some implementations. As discussed above, the perceived quality of a video sequence improves as a viewer's physical distance from the display device increases, a frame rate is reduced, or the screen size is reduced. Thus, in this example, the perceived quality of the first display device 702 may be lower than the perceived quality of the same video sequence presented on display the second display device 704 or the third display device 706.

This perceived difference in quality may be used to generate human visual system model settings, such as human visual system model settings 708, 710, and 712, that may reflect the different viewing experiences with respect to the first display device 702, the second display device 704, and the third display device 706. A quality assessment system may be configured to virtually model the perceived quality associated with displaying the same video sequence on each of the first display device 702, the second display device 704, and the third display device 706 by applying the human visual system model at corresponding human visual system model settings 708-712 to both a reference video sequence (such as an original video sequence) and a distorted video sequence (e.g., such as a compressed and decompressed video sequence).

In some cases, the quality assessment system may be configured to utilize human visual system model settings in the form of quantizers representative of characteristics of human vision. Thus, the quality assessment system may use the quantizers to model the quality metric that is representative of a viewing experience of the viewer (e.g., an average viewer) with respect to the quality assessment score.

Figure 8:
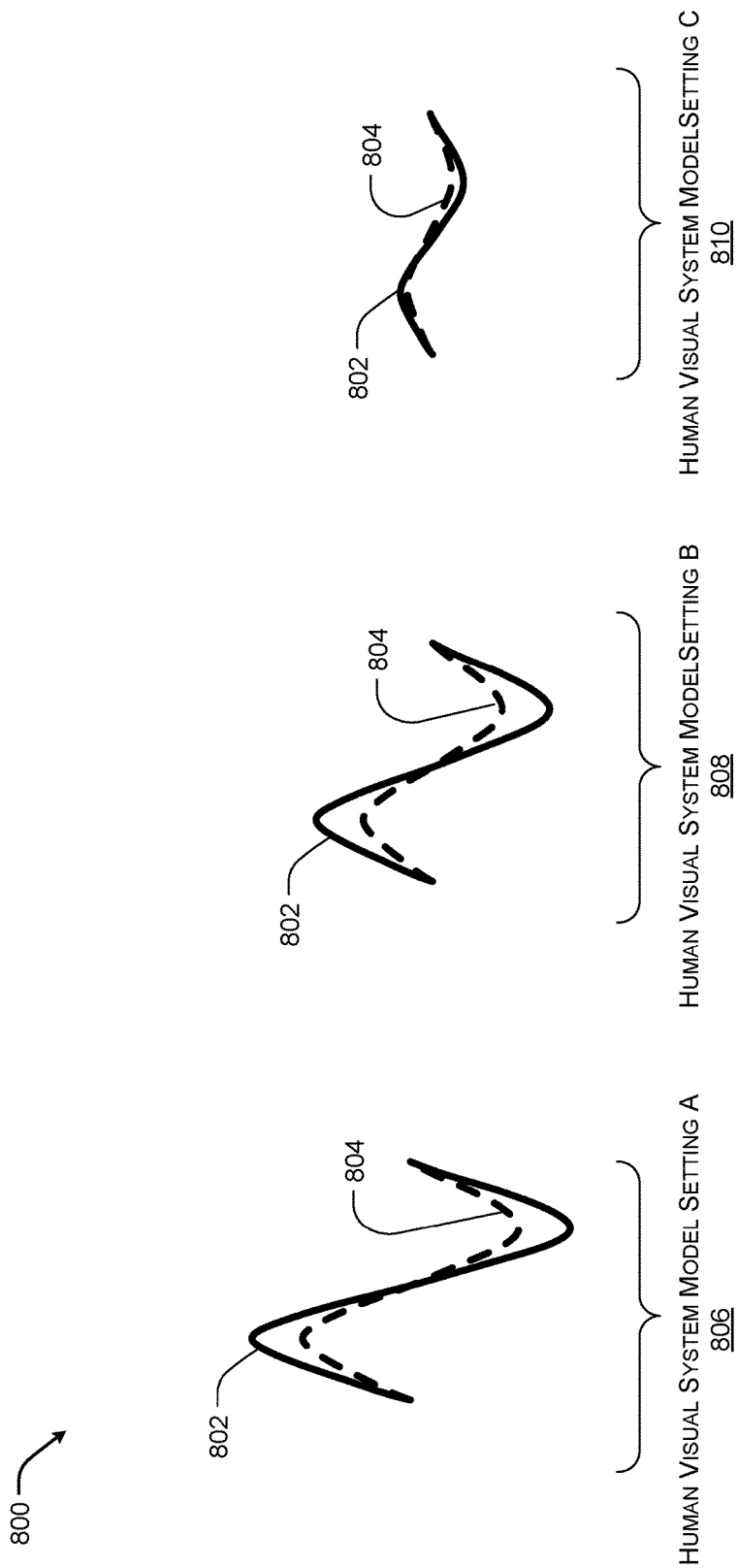
FIG. 8 is an example illustrating convergence of a quality with respect to a reference video sequence and a distorted video sequence as human visual system model settings are modulated according to some implementations.

FIG. 8 is an example 800 illustrating convergence of a quality with respect to a reference video sequence 802 and a distorted video sequence 804 as human visual system model settings are increased from human visual system model settings 806 to human visual system model settings 810 according to some implementations. For example, as the human visual system model settings 806-810 altered to represent a smaller display devices or increased distance of a viewer from the display, the quality assessment model's coefficients decrease in magnitude and the reference video sequence 802 and distorted video sequence 804 modeled coefficients converge, as shown.

Figure 9:
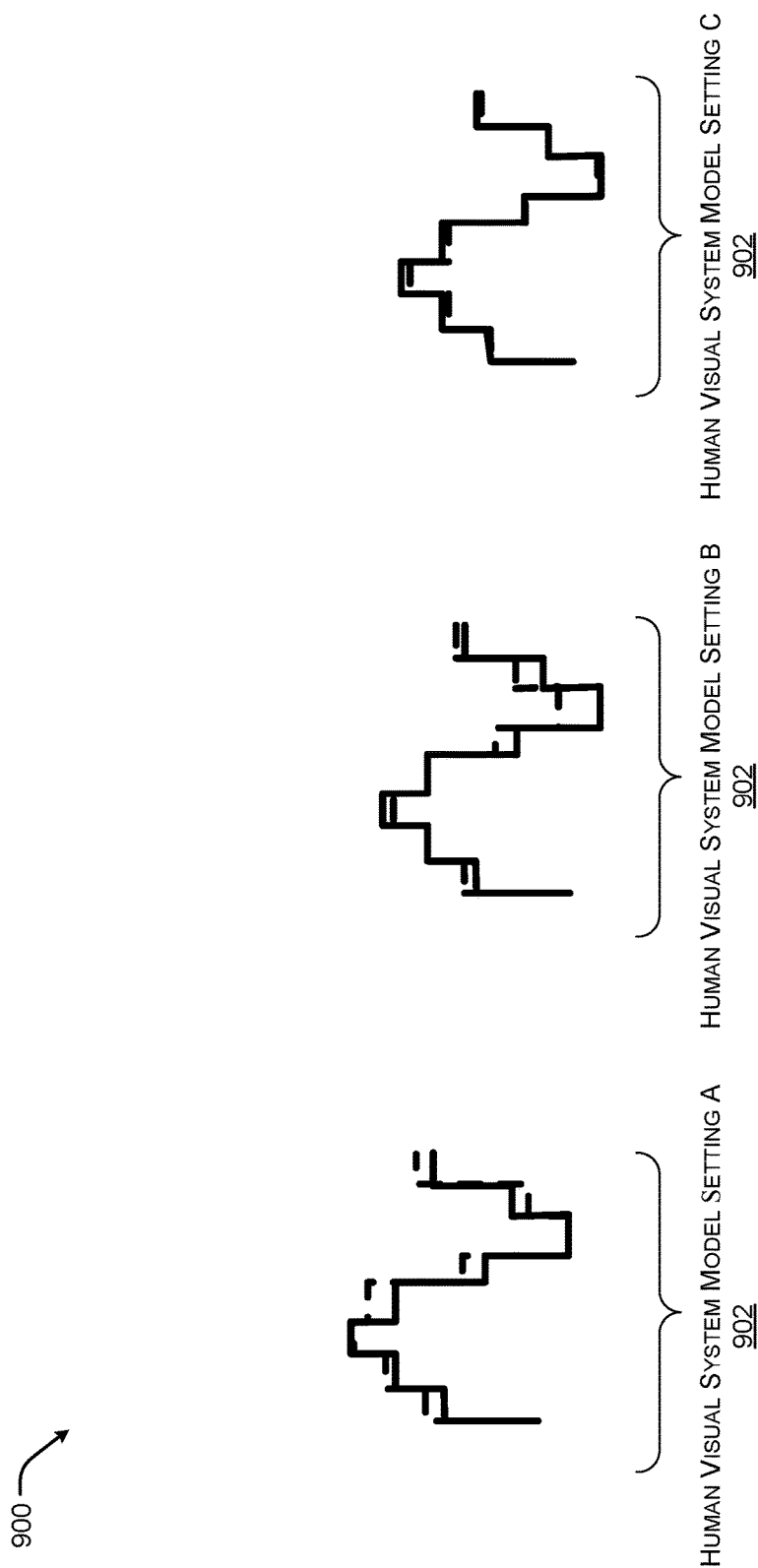
FIG. 9 is another example illustrating convergence of a quality with respect to a reference video sequence and a distorted video sequence as human visual system model settings are modulated according to some implementations.

FIG. 9 is another example 900 illustrating convergence of a quality with respect to a reference video sequence 902 and a distorted video sequence 904 as human visual system model settings are increased (e.g., altered to represent a smaller display devices, increased distance of a viewer from the display, etc.) from human visual system model settings 906 to human visual system model settings 910 as discussed above with respect to FIG. 8. In this example, the pixels of the reference video sequence and the distorted video sequence have been de-quantized. In this example, a magnitude of the visual model's transform coefficients are inversely correlated with perceptual acuity. So, as the visual human visual system model settings 906-910 are increased, perceptual content is removed from both the reference video sequence 902 and distorted video sequence 904. As perceptual content determines visual quality, convergence with respect to the perceptual content within the reference video sequence 902 and distorted video sequence 904 may be used to determine or model a difference in visually quality (e.g., a quality assessment score) between the reference video sequence 902 and distorted video sequence 904.

In some cases, the faster the reference video sequence 902 and distorted video sequence 904 converge, the closer the distorted video sequence 904 is in quality to the reference video sequence 902. Likewise, a slower convergence indicates that the distorted video sequence 904 is perceptually farther away in quality from the reference video sequence 904. Thus, in some implementations, a quality assessment system may be configured to systematically modify the human visual system model settings to determine a rate of convergence between the perceptual content of the reference video sequence 902 and the distorted video sequence 904. In this manner, the rate of convergence associated with the perceptual content of the reference video sequence 902 and the distorted video sequence 904 may be used to estimate or determine the quality assessment score of the distorted video sequence 904.

Figure 10:
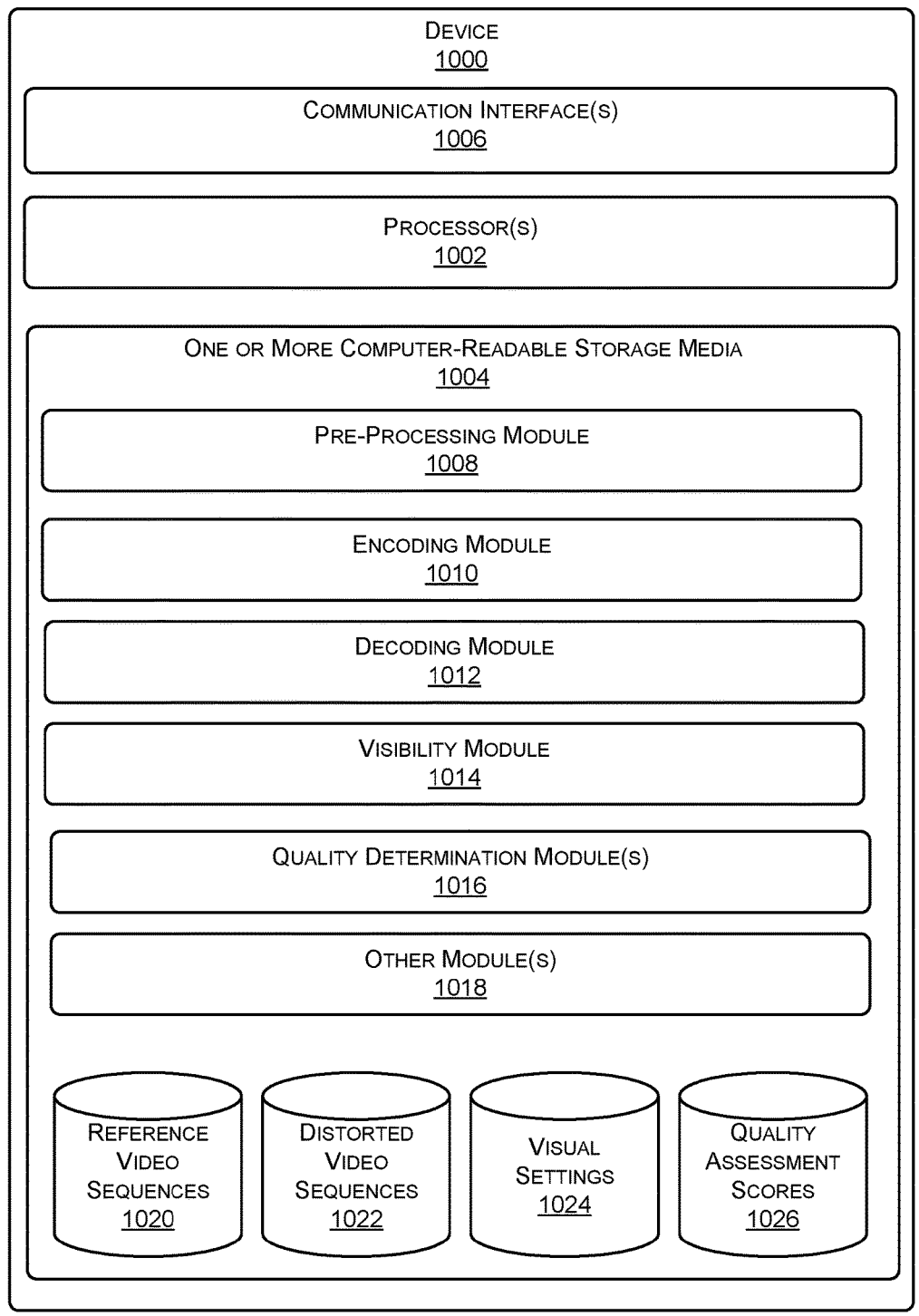
FIG. 10 illustrates example components of an electronic device that may be configured to determine quality assessment scores of a distorted video sequence with respect to a reference video sequence according to some implementations

FIG. 10 illustrates example components of an electronic device 1000 that may be configured to determine quality assessment scores of a distorted video sequence with respect to a referenced video sequence according to some implementations. For example, electronic device 1000 may include processing resources, as represented by processors 1002, and computer-readable storage media 1004. The computer-readable storage media 1004 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The electronic device 1000 may also include one or more communication interfaces 1006, which may support both wired and wireless connection to various networks, such as cellular networks, radio (e.g., radio-frequency identification RFID), WiFi networks, short-range or near-field networks (e.g., Bluetooth®), infrared signals, local area networks, wide area networks, the Internet, and so forth. For example, the communication interfaces 1006 may allow the electronic device 1000 to send or stream compressed video sequences over one or more networks, such as the Internet®.

Several modules, sets of instructions, data stores, and so forth may be stored within the computer-readable storage media 1004 and configured to execute on the processors 1002. For example, a pre-processing module 1008, an encoding module 1010, and a decoding module 1012, a visibility module 1014, a quality determination module 1016 as well as other modules 1018 can be stored by the one or more computer-readable storage media 1004. In some implementations, the computer-readable storage media 1004 may store data, such as reference video sequences 1020, distorted video sequences 1022, human visual system model settings 1024, and quality assessment scores 1026. In some cases, the human visual system model settings 1024 may be utilized to represent the viewing conditions associated with a human watching the display of a video sequence. For example, the human visual system model settings 1024 may represent spatial/temporal associated with the display of a video sequences. In other cases, the human visual system model settings 1024 may be quantizers, such as one or more quantizers human visibility quantizer applied in a transform domain, such as a decorrelated transform domain.

The pre-processing module 1008 may process a reference video sequence 1020 to generate a pre-processed video sequence representative of the reference video sequence 1020. For instance, the pre-processing module 1008 may process the reference video sequence 1020 in a manner substantially similar to pre-processing prior to encoding and transmitting of the reference video sequence 1020 over a network via the communication interface 1006. In some cases, the pre-processing module 1008 may perform operations such as spatial down sampling, temporal down sampling, bandwidth encoding, color quantization, interlacing, spatial blurring, among others in the reference video sequence 1020 to generate the pre-processed video sequence.

The encoding module 1010 may be configured to encode or compress the pre-processed video sequence in a manner substantially similar to encoding and transmitting of the reference video sequence 1020 over a network via the communication interface 1006. For example, the encoding module 1010 may apply encoding schemes such as H.262/MPEG-2, VP-9, among others.

The decoding module 1012 may be configured to decompress the compressed pre-processed video sequence to generate the distorted video sequence 1022 representative of a video sequence received by a viewer or end user. For example, the decoding module 1012 may be configured to utilize the same compression scheme as the encoder module 1010.

The visibility module 1014 may be configured to perform one or more operations to apply the human visual system model at various human visual system model settings 1024 to the reference video sequence 1020 and the distorted video sequence 1022. For example, the visibility module 1014 may perform operations on both the reference video sequence 1020 and the distorted video sequence 1022 to simulate or represent the viewing quality experienced by a user under the parameters denoted by the human visual system model settings 1024 applied. In some cases, the visibility module 1014 may apply the human visual system model at multiple human visual system model settings 1024 to both the reference video sequence 1020 and the distorted video sequence 1022 to assist in determining the quality of the distorted video sequence 1022 with respect to the reference video sequence 1020 under various different viewing conditions.

The quality determination module 1016 may compare each pair of distorted video sequence 1022 and the reference video sequence 1020 to determine a quality assessment score 1026 for the distorted video sequence 1022 with respect to the human visual system model settings 1024 applied and the reference video sequence 1020. For example, the quality determination module 1016 may for each human visual system model setting 1024 by using a mean squared error (MSE). For example, a difference value at each pixel in each frame from the reference video sequence 1020 is compared to each pixel in each frame from the distorted video sequence 1022 as follows:

$$MSE = 1/N \sum_{i,j} (\text{Reference}(i, j) - \text{Distorted}(i, j))^2$$

where i, j are pixel indices of the distorted video sequence 1022 and the reference video sequence 1020, respectively. In other examples, the quality determination module 1016 may determine the quality assessment score 1026 using a peak signal-to-noise ratio. In another alternative example, the quality assessment score 1026 at a particular human visual system model setting 1024 may be determined by the mean squared error of various block sizes of quantized coefficients associated with each block of pixels in the reference video sequence 1020 and distorted video sequence 1022. In this case, i and j in the preceding MSE equation would be the index of the quantized preprocessor coefficients associated with pixel i, j in the modified reference video sequence 1020 and distorted video sequence 1022. In some cases, the quality determination module 1016 may identify one or more human visual system model settings 1024 at which the MSE or quality assessment score 1026 of the distorted video sequence 1022 stabilizes. A stabilization of the quality assessment score 1026 may indicate that at the corresponding human visual system model settings 1024, the perceived quality of the distorted video sequence 1022 is substantially equal to the perceived quality of the reference video sequence 1020.

Figure 11:
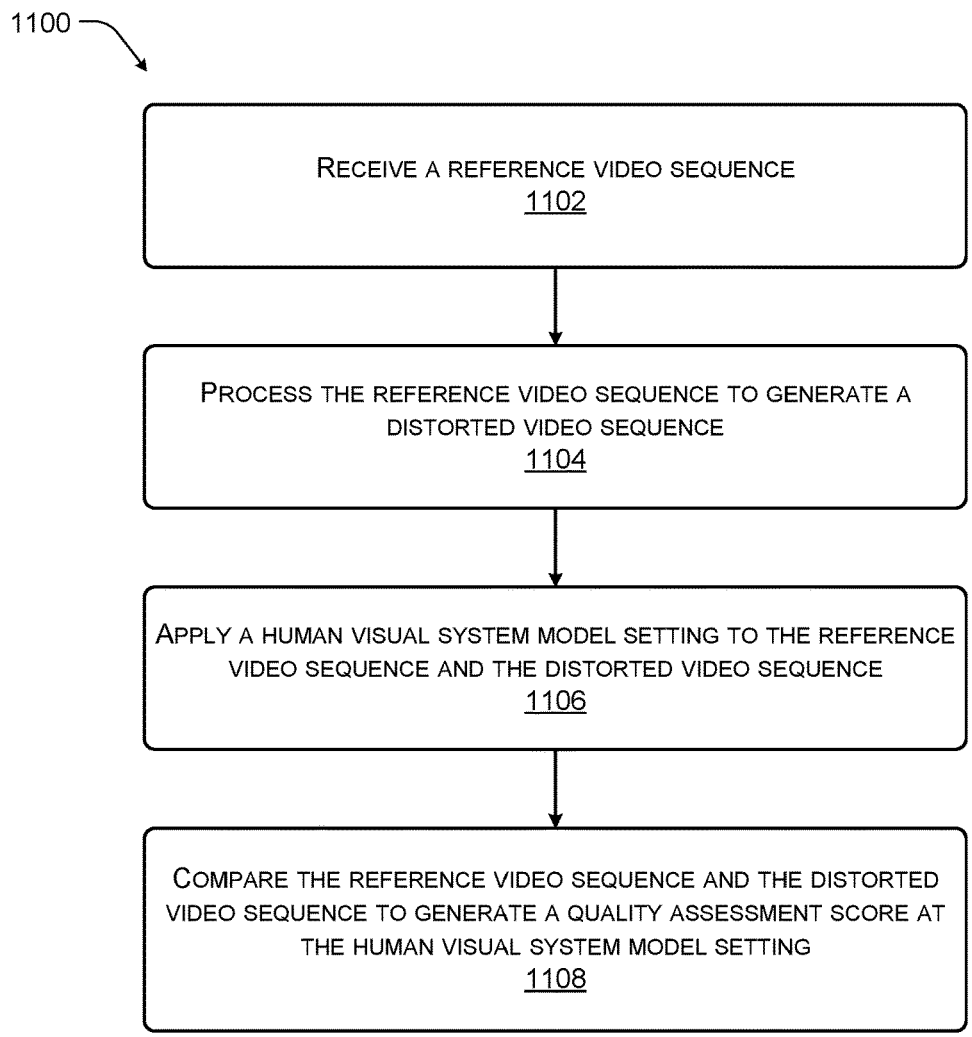
FIG. 11 is an example flow diagram showing an illustrative process for determining a quality assessment score of a distorted video sequence with respect to a reference video sequence according to some implementations.
Figure 12:
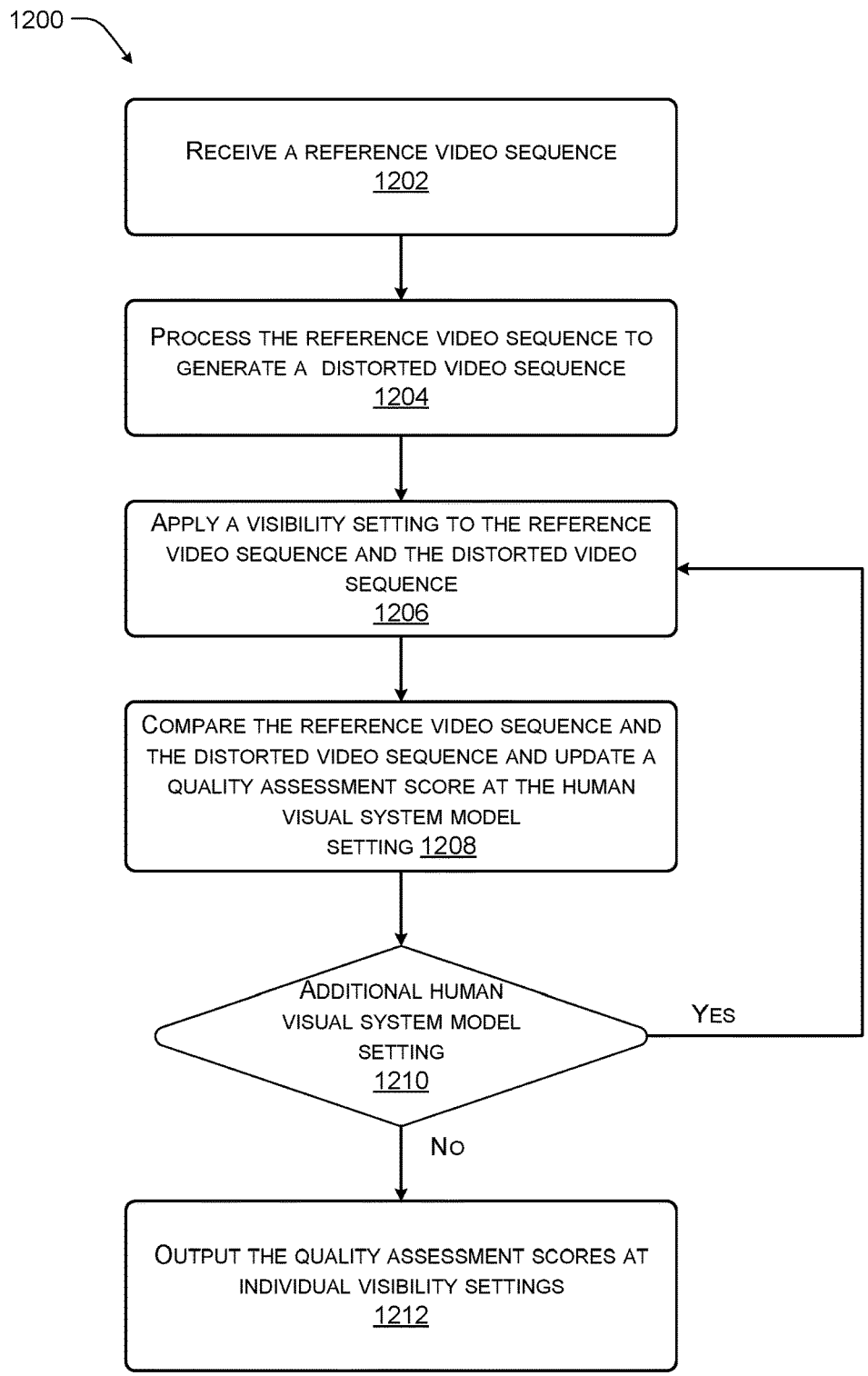
FIG. 12 is an example flow diagram showing an illustrative process for determining a quality assessment score of a distorted video sequence with respect to a reference video sequence according to some implementations.
Figure 13:
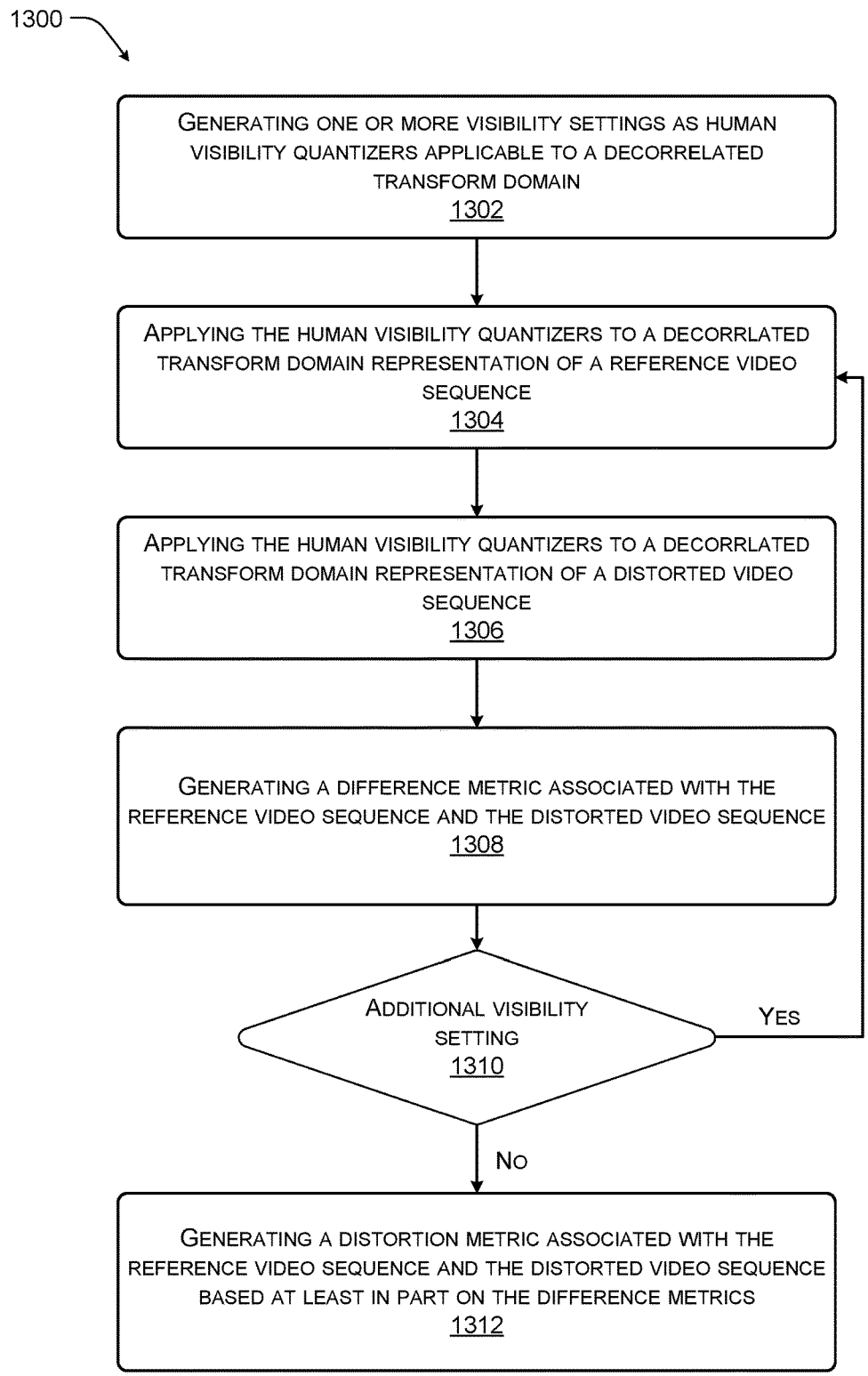
FIG. 13 is an example flow diagram showing an illustrative process for determining a quality assessment score of a distorted video sequence with respect to a reference video sequence using human visibility quantizers according to some implementations.

FIGS. 11-13 are flow diagrams illustrating example processes associated with objectively determining a quality assessment score of a distorted video sequence with respect to a reference video sequence. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 11 is an example flow diagram showing an illustrative process 1100 for determining a quality assessment score of a distorted video sequence with respect to a reference video sequence according to some implementations. As discussed above, content providers attempt to measure quality of video content being provided and displayed to end users in a qualitative manner in order to inform the end users of the quality of the content and to meet various standards associated with the industry. Traditionally, the content providers has a human focus group of 20-50 individuals rate a video sequence to determine a DMOS for each video sequence being sent, transmitted, and/or displayed to the end user. Unfortunately, obtaining a DMOS score in the conventional manner is costly, time consuming, and subject to variability based on the variations in human preferences and abilities (e.g., enjoyment of a video sequence and/or characteristics of the individual's eyes). Thus, the process 1100 discusses a process for rating the quality of a video sequence without the use of human based study groups.

At 1102, a system may receive a reference video sequence. For example, the reference video sequence may be an original non-processed version of a video sequence that may be transmitted to an end user for display over one or more networks.

At 1104, the system may be configured to process or pre-process the reference video sequence to generate a distorted video sequence. For example, the system may perform operations such as spatial down sampling, temporal down sampling, bandwidth encoding, color quantization, interlacing, spatial blurring, among others in the reference video sequence to generate the pre-processed video sequence.

At 1106, the system may apply or perform operations associated with a human visual system model setting to the reference video sequence and the distorted video sequence to simulate a viewing condition associated with the display of the video sequence. For example, a human visual system model setting may be configured to represent a distance and/or screen size associated with a periocular viewing experience. In some cases, the system may apply the human visual model at multiple human visual system model settings representative of multiple viewing experiences in multiple iterations such that each iteration may be used to determine a quality assessment score for the distorted video sequence with respect to the corresponding human visual system model settings.

At 1108, the system may compare the reference video sequence and the distorted video sequence to generate a quality assessment score at the human visual system model setting. For example, the system may determine the quality assessment score for a human visual system model setting by using a MSE calculation on the reference video sequence and the distorted video sequence. For example, a difference value at each pixel in each frame from the reference video sequence may be compared to each pixel in each frame from the distorted video sequence. In other examples, the system may determine the quality assessment score using a peak signal-to-noise ratio of the reference video sequence and the distorted video sequence.

FIG. 12 is an example flow diagram showing an illustrative process 1200 for determining a quality assessment score of a distorted video sequence with respect to a reference video sequence according to some implementations. In this example, similar to the process 1100 above, rather than use a human based rating system, such as the DMOS ratings discussed above, a system may be configured to receive a reference video sequence and one or more human visual system model settings and determine a quality assessment score representative of the perceived quality of a distorted version of the reference video sequence, such as a compressed and decompressed version.

At 1202, the system may receive a reference video sequence. For example, the reference video sequence may be an original non-processed version of a video sequence that may be transmitted to an end user for display over one or more networks.

At 1204, the system may be configured to process or pre-process the reference video sequence to generate a distorted video sequence. For example, the system may perform operations such as spatial down sampling, temporal down sampling, bandwidth encoding, color quantization, interlacing, spatial blurring, among others in the reference video sequence to generate the pre-processed video sequence.

At 1206, the system may apply or perform operations associated with a human visual system model setting to the reference video sequence and the distorted video sequence to simulate a viewing condition associated with the display of the video sequence. For example, a human visual system model setting may be configured to represent a distance and/or screen size associated with a periocular viewing experience.

At 1208, the system may compare the reference video sequence and the distorted video sequence to generate a quality assessment score at the human visual system model setting. For example, the system may determine the quality assessment score for a human visual system model setting by using a MSE calculation on the reference video sequence and the distorted video sequence. For example, a difference value at each pixel in each frame from the reference video sequence may be compared to each pixel in each frame from the distorted video sequence. In other examples, the system may determine the quality assessment score using a peak signal-to-noise ratio of the reference video sequence and the distorted video sequence.

At 1210, the system may determine if additional human visual system model settings should be tested. In some cases, the system may apply the human visual model at multiple human visual system model settings repetitive of multiple viewing experiences in multiple iterations such that each iteration may be used to determine a quality assessment score for the distorted video sequence with respect to the corresponding human visual system model settings. For example, in some cases, the system may determine one or more human visual system model settings at which the quality assessment score stabilizes or the perceived content of the reference video sequence and the distorted video sequence converge, as discussed above with respect to FIGS. 8 and 9. In some cases, the system may indicate that at the one or more human visual system model settings the perceived quality of the distorted video sequence is substantially equal to the perceived quality of the reference video sequence. If the system determines that additional human visual system model settings should be applied, the process 1200 returns to 1206. Otherwise, the process 1200 proceeds to 1212 and the system outputs the quality assessment scores of the distorted video sequence at individual human visual system model settings.

FIG. 13 is an example flow diagram showing an illustrative process 1300 for determining a quality assessment score of a distorted video sequence with respect to a reference video sequence using human visibility quantizers according to some implementations. For example, the human visibility quantizers may be used to represent conditions associated with viewing of a video sequence as well as characteristics of the human vision in order to determine a quality assessment score with respect to the video sequence.

At 1302, a system may generate or receive one or more human visual system model settings as human visibility quantizers applicable to a transform domain, such as a decorrelated transform domain. In some cases, the human visibility quantizers may be generated based at least in part on a human contrast sensitivity function. In other cases, the human visibility quantizers may be generated based at least in part on a distance, such as measured in screen sizes, between a viewing position and the display device. In still other cases, the human visibility quantizers may be generated based at least in part on frame rate or screen size of the display device. In one specific case, the human visibility quantizers may be generated based at least in part on one or more characteristics of the display environment, such as the lighting quality captured by one or more photo sensors within the viewing environment.

At 1304, the system may apply the human visibility quantizers to a decorrelated transform domain representation of a reference video sequence. For example, the reference video sequence may be an original unprocessed, uncompressed, etc. version of a video sequence being scored.

At 1306, the system may apply the human visibility quantizers to a decorrelated transform domain representation of a distorted video sequence. For example, the distorted video sequence may have undergone operations such as spatial down sampling, temporal down sampling, bandwidth encoding, color quantization, interlacing, spatial blurring, among others in the reference video sequence to generate the distorted video sequence.

At 1308, the system may generate a difference metric associated with the reference video sequence and the distorted video sequence. For example, the difference metric may determine a difference between the reference video sequence and the distorted video sequence within the decorrelated transform domain representations.

At 1310, the system may determine if additional human visual system model settings should be tested. In some cases, the system may apply the human visual system model at multiple human visual system model settings representative of multiple viewing experiences in multiple iterations such that each iteration may be used to determine a quality assessment score for the distorted video sequence with respect to the corresponding human visual system model settings. If the system determines that additional human visual system model settings should be applied, the process 1300 returns to 1304. Otherwise, the process 1300 proceeds to 1312.

At 1312, the system may generate a distortion metric (e.g., a quality assessment score) associated with the reference video sequence and the distorted video sequence based at least in part on the difference metrics. For example, the system may determine one or more human visual system model settings at which the difference metric stabilizes. At these settings, the quality between the reference video sequence and the distorted video sequence may be considered to be substantially equal.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   circuitry to:
   identify at least one spatial temporal human visual system model visibility setting;
   apply at least one spatial temporal human visual system model visibility setting to a reference video sequence to generate a modified reference video sequence;
   apply the at least one spatial temporal human visual system model visibility setting to a distorted video sequence to generate a modified a distorted video sequence;
   a quality determination unit to generate a quality assessment score by determining a difference metric between a decorrelated transform domain representation of the reference video sequence and a decorrelated transform domain representation of the distorted video sequence following application of a set human visibility quantizers to the decorrelated transform domain representation of the distorted video sequence and the decorrelated transform domain representation of the reference video sequence.

2. The system as recited in claim 1, wherein the at least one spatial temporal human visual system model visibility setting includes human visibility quantizers applicable to a decorrelated transform domain.

3. The system as recited in claim 1, wherein the quality assessment score is based at least in part on an error metric or a difference metric.

4. The system as recited in claim 1, wherein the quality assessment score is based at least in part on a mean squared error calculation.

5. The system as recited in claim 1, wherein the quality assessment score is a distortion metric determined based at least in part on the difference metric.

6. The system as recited in claim 1, further comprising a compressor configured to receive the quality assessment score and to adjust at least one parameter associated with operations performed with respect to generating the distorted video sequence.

7. The system as recited in claim 1, wherein the distorted video sequence is a pre-processed version of the reference video sequence.

8. The system as recited in claim 1, wherein the distorted video sequence is a compressed and decompressed version of the reference video sequence.

9. A method comprising:
   applying at least one spatial temporal human visual system model visibility setting to a reference video sequence to generate a modified reference video sequence, the at least one spatial temporal human visual system model visibility setting includes human visibility quantizers applicable to a decorrelated transform domain, wherein applying the at least one spatial temporal human visual system model visibility setting to the reference video sequence includes applying a set of human visibility quantizers to a decorrelated transform domain representation of the reference video sequence;
   applying the at least one spatial temporal human visual system model visibility setting to a distorted video sequence to generate a modified distorted video sequence, wherein applying the at least one spatial temporal human visual system model visibility setting to the distorted video sequence includes applying the set of human visibility quantizers to a decorrelated transform domain representation of the distorted video sequence; and
   generating a quality assessment score based at least in part on the modified reference video sequence and the modified distorted video sequence, wherein generating the quality assessment score includes:
      determining a difference metric between the modified reference video sequence and the modified reference video sequence within the decorrelated transform domain; and
      determining a distortion metric based at least in part on the difference metric.

10. The method as recited in claim 9, further comprising adjusting at least one parameter associated with operations performed with respect to generating the distorted video sequence.

11. The method as recited in claim 10, wherein the operations are associated with pre-processing the reference video sequence to generate the distorted video sequence.

12. The system as recited in claim 10, wherein the operations are associated with compressing the reference video sequence to generate the distorted video sequence.

13. One or more non-transitory computer-readable media having computer-executable instructions which, when executed by one or more processors, cause the one or more processors to perform operations comprising:
   applying a set of human visibility quantizers to a decorrelated transform domain representation of a reference video sequence;
   applying the set of human visibility quantizers to a decorrelated transform domain representation of a distorted video sequence;
   determining a difference metric between the decorrelated transform domain representation of the reference video sequence and the decorrelated transform domain representation of the distorted video sequence, following application of the set human visibility quantizers to the decorrelated transform domain representation of the distorted video sequence and the decorrelated transform domain representation of the reference video sequence; and
   determining a quality assessment score based at least in part on the difference metric.

14. The one or more non-transitory computer-readable media as recited in claim 13, wherein the operations further comprise generating the distorted video sequence by performing at least one operation on the reference video sequence.

15. The one or more non-transitory computer-readable media as recited in claim 13, wherein the quality assessment score is based at least in part on a mean squared error calculation.

16. The one or more non-transitory computer-readable media as recited in claim 13, wherein the quality assessment score is based at least in part on a distortion metric.

17. The one or more non-transitory computer-readable media as recited in claim 13, wherein the set of human visibility quantizers are representative of at least one viewing condition associated with displaying the distorted video sequence.

18. The one or more non-transitory computer-readable media as recited in claim 13, wherein the quality assessment score is based at least in part on a mean squared error of various block sizes of the set of human visibility quantizers associated with each block of pixels in the decorrelated transform domain representation of the reference video sequence and the decorrelated transform domain representation of the distorted video sequence.

19. The one or more non-transitory computer-readable media as recited in claim 13, further comprising providing the quality assessment score to an encoder to assist in tuning a pre-processing of the distorted video sequence.

* * * * *